US 8,401,751 B2

(12) United States Patent
Jacobson et al.

(10) Patent No.: US 8,401,751 B2
(45) Date of Patent: Mar. 19, 2013

(54) SHIFT CONTROL AND METHOD (75) Inventors: Evan Jacobson, Edwards, IL (US);
Michael A. Weber, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 182 days.

(21) Appl. No.: 13/049,214

(22) Filed: Mar. 16, 2011

(65) Prior Publication Data
US 2012/0226422 A1 Sep. 6, 2012

Related U.S. Application Data (60) Provisional application No. 61/448,035, filed on Mar. 1, 2011.

(51) Int. Cl.
G06F 7/00 (2006.01)
(52) U.S. Cl. .......................................... 701/58
(58) Field of Classification Search ................ None
See application file for complete search history.

(56) References Cited

U.S. PATENT DOCUMENTS
6,496,767 B1  12/2002  Lorentz

Primary Examiner — Thomas Tarcza
Assistant Examiner — Adam Alharbi
(74) Attorney, Agent, or Firm — Leydig, Voit & Mayer (57) ABSTRACT A machine has a power train including a prime mover connected to a transmission having two or more selectable gear settings. The machine includes an electronic controller configured to receive and transmit signals indicative of machine parameters. The electronic controller contains computer executable instructions for determining a current value for at least one efficiency metric of the machine at a current gear setting of the transmission. Instructions for determining a first expected value for the efficiency metric at a first alternative gear setting, instructions for comparing the current value with the first expected value to determine an optimal gear setting as between the current gear setting and the first alternative gear setting at least partially based on engine speed, and instructions for indicating a gear shift recommendation and/or performing a gear shift to select the optimal gear setting are executed during operation.

20 Claims, 6 Drawing Sheets

SHIFT CONTROL AND METHOD

CROSS REFERENCE TO RELATED APPLICATIONS

This patent application claims the benefit of U.S. Provisional Patent Application No. 61/448,035, filed Mar. 1, 2011, which is incorporated herein in its entirety by this reference.

TECHNICAL FIELD

This patent disclosure relates generally to powertrains having an engine connected to a transmission and, more particularly, to a powertrain having an adaptive shift control and/or a shift indicator such that the power train may operate more efficiently.

BACKGROUND

Transmissions typically control gear ratio changes in accordance with a shift map or based on gear selections by an operator. Specifically for work machines, such as tractors and motor graders, transmission may incorporate automatic shifts to maintain a desired groundspeed. However, when the machine is working, the operators will typically disable the automatic shifting to ensure that the machine will have sufficient torque to, for example, overcome obstacles such as boulders and the like, and to travel on inclines, and the like.

Power trains that include transmissions connected to engines through torque converters, and/or other components, can often operate at different gear ratios, engine speeds, and torque converter settings to provide a substantially constant ground speed for the machine, which is selected by an operator. Any one of several different combinations of engine speed and transmission gear ratio may provide a desired groundspeed. Because of this inherent flexibility, although an operator may select an appropriate gear ratio to perform a machine function, such selection may not always be the most efficient from the operating standpoint of the machine, which can result in increased noise and reduced fuel efficiency.

One example of an automatically shifting transmission can be seen in U.S. Pat. No. 6,496,767 (the '767 patent), which issued on Dec. 17, 2002. The '767 patent describes a method for determining shift points in a step gear transmission system that maximizes fuel economy. The method uses fuel economy data from various gear ratios to calculate decision curves. These decision curves are then used during operation to minimize fuel consumption while maintaining a desired ground speed.

Although the method disclosed in the '767 patent is effective in reducing fuel consumption in machines, it cannot assure that the best overall operating efficiency of a machine can be achieved under a broad range of operating conditions. Moreover, it cannot prevent operation in an inefficient gear that is selected by an operator that overrides the automatic shifting functionality.

SUMMARY

In one aspect, the present disclosure describes a machine having a power train that includes a prime mover connected to a transmission having two or more selectable gear settings. The machine further includes an electronic controller configured to receive and transmit signals indicative of machine parameters. The electronic controller contains computer executable instructions. The computer executable instructions include instructions for determining a current value for at least one efficiency metric of the machine during operation at a current gear setting of the transmission. Instructions for determining a first expected value for the at least one efficiency metric of the machine during operation at a first alternative gear setting of the transmission, instructions for comparing the current value for at least one efficiency metric with the first expected value for the at least one efficiency metric to determine an optimal gear setting as between the current gear setting and the first alternative gear setting, and instructions for at least one of indicating a gear shift recommendation for an operator and performing a gear shift to select the optimal gear setting are also included.

In another aspect, the disclosure describes a method for operating a machine having an engine connected to a multi-gear power-shift transmission. The engine may operate at a current engine speed and provide a current torque. The method includes determining a current value for an efficiency parameter of the machine while travelling at a current ground speed and expending a current work under a current gear setting. A first alternative value for the efficiency parameter of the machine is estimated while the machine is travelling at substantially the current ground speed and expending at least the current work under a first alternative gear setting. A second alternative value for the efficiency parameter of the machine is also estimated while the machine is travelling at substantially the current ground speed and expending at least the current work under a second alternative gear setting. The current value, the first alternative value and the second alternative value are compared to one another, and an optimum value is selected as between the current, first and second values. The current gear setting is maintained when the current value is selected as the optimum value, and an indication that a gear shift from the current gear setting to the first or second gear setting is desired is provided when, respectively, the first or second alternative value is selected as the optimum value.

In yet another aspect, the disclosure describes a power train including an engine connected to a multi-gear power-shift transmission. The transmission is adapted to operate a drive system at a desired ground speed and power output. The power train further includes an electronic controller configured to determine a current value for an efficiency parameter while the power train is in a condition adapted for causing the drive system to cause travel of a machine at a current ground speed and expend a current work under a current gear setting of the transmission. The electronic controller further estimates a first alternative value for the efficiency parameter of the power train under a first alternative gear setting of the transmission, and a second alternative value for the efficiency parameter of the power train under a second alternative gear setting of the transmission. The electronic controller compares the current value, the first alternative value and the second alternative value to one another and selects, as between the current, first and second values, an optimum value. The current gear setting is maintained when the current value is selected as the optimum value, and an indication that a gear shift from the current gear setting to the first or second gear setting is desired is provided when, respectively, the first or second alternative value is selected as the optimum value while still adapted to maintain the current ground speed and expend at least the current work.

DETAILED DESCRIPTION

This disclosure relates to transmissions for use in power trains and, more particularly, to transmissions used in power trains for machines. Although a particular type of machine is illustrated and described hereinafter, the term "machine" may refer to any machine that performs some type of operation associated with an industry such as mining, construction, farming, transportation, marine or any other industry known in the art. For example, a machine may be an earth-moving machine, such as a wheel loader, excavator, dump truck, backhoe, motor grader, material handler, or another type of machine, such as a locomotive, paver or the like. Similarly, although an exemplary blade is illustrated as the attached implement of the machine shown herein, an alternate implement may be included. Any implements may be utilized and employed for a variety of tasks, including, for example, loading, compacting, pushing, lifting, brushing, and include, for example, buckets, compactors, forked lifting devices, brushes, grapples, cutters, shears, blades, breakers/hammers, augers, tillers, rippers, and others.

Figure 1:
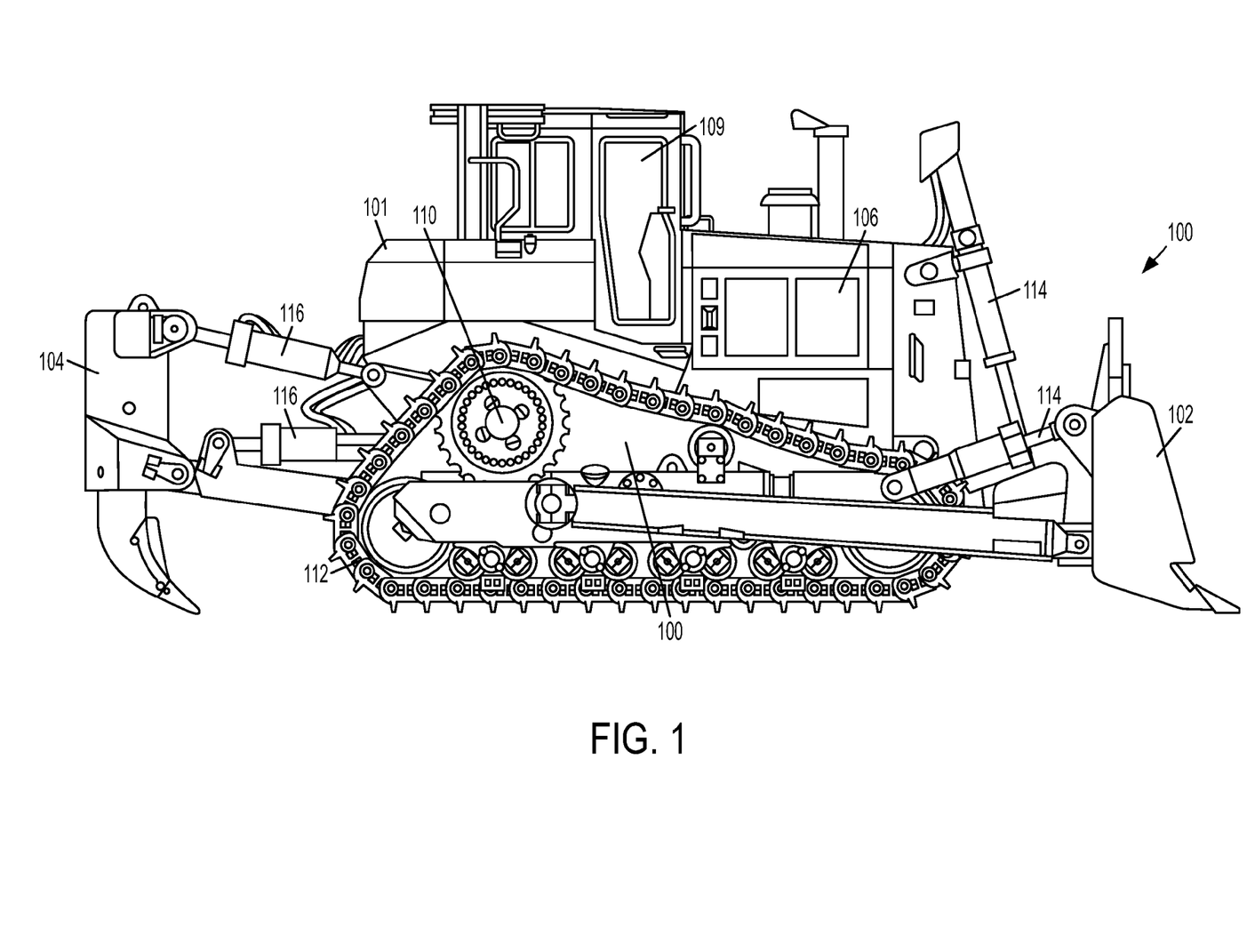
FIG. 1 is an outline view of a machine in accordance with the disclosure.

An outline view of a machine 100 is shown in FIG. 1. The machine 100 is shown as a track-type tractor 101 having a bulldozer blade 102 and a ripper 104 as implements, although other work implements may be used. The track-type tractor 101 includes an engine 106 connected to a chassis 108. A cab 109 is connected to the chassis 108. The engine 106 provides power to operate drive sprockets 110 that cause tracks 112 to selectively rotate and propel the track-type tractor 101 along. The engine 106 further provides power to operate the various implements, such as actuators 114 and 116 that can selectively position the blade 102 and the ripper 104 relative to the chassis 108. The power provided by the engine 106 is mechanical power, which may be transferred to various components and systems of the machine 100, for example, by use of drive train components. Additionally or alternatively, engine power may be transformed to other forms of power, such as electrical, hydraulic and the like. In the illustrated embodiment, the drive sprockets are mechanically coupled to an output shaft of the engine 106 through various power transmission components, some of which are described hereinafter. The actuators 114 and 116 are configured to receive pressurized hydraulic fluid that is compressed by a pump that receives mechanical power from the engine 106.

Figure 2:
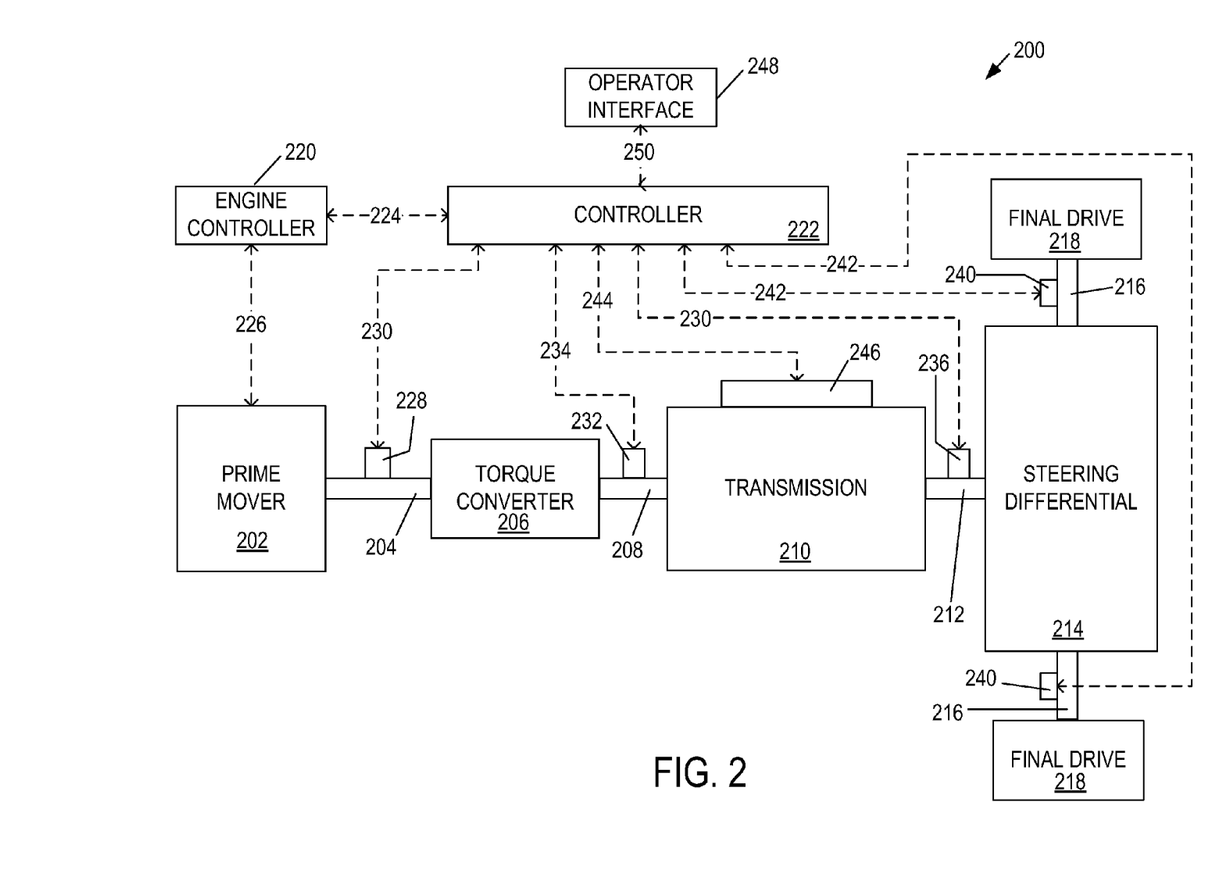
FIG. 2 is a block diagram of a power train for a machine in accordance with the disclosure.

A block diagram of a power train 200 of the machine 100 is shown in FIG. 2. The power train 200 includes a prime mover 202. The prime mover 202 may be an engine, for example, the engine 106 (FIG. 1), or another type of device, such as an electric motor, a hydraulic actuator, and others. The prime mover 202 has an output shaft 204 capable of powered rotation. The output shaft 204 is connected to a torque converter 206. The torque converter 206 is a device configured to provide multiplication of an input torque. In the illustrated embodiment, the torque converter 206 multiplies the torque provided by the prime mover 202, via the shaft 204, to a transmission input shaft 208. The torque converter 206 may be any appropriate type of torque converter device such as a viscous fluid device and the like. The torque converter 206 may alternatively be a torque transfer device, such as a clutch, which may replace or be used in addition to a viscous-fluid torque transfer device.

The transmission input shaft 208 is configured to transfer torque and, in general, mechanical power, to a transmission 210. The transmission 210 illustrated in FIG. 2 is a power shift transmission that includes a series of planetary gears that can selectively provide predetermined gear ratios between the transmission input shaft 208 and a transmission output shaft 212. In the illustrated embodiment, the transmission 210 is configured to provide three gear ratios for forward motion and three gear ratios for reverse motion of the machine 100. Each gear set of the transmission may use large-diameter, high capacity, oil-cooled clutches (not shown) to selectively engage the various gear sets that provide a desired gear ratio during operation.

The output shaft 212 of the transmission 210 is configured to provide motive power to ground engaging elements, for example, the tracks 112 (FIG. 1), that move the machine 100 along. The motive power may be provided in any appropriate form. In the case of skid-steer machines, such as the track-type tractor 101, various arrangements may be used to selectively power each track of the machine such that the machine can steer. In the illustration of FIG. 2, the output shaft 212 is connected to a steering differential 214, but other arrangements may be used. The steering differential 214 includes planetary gear arrangements that can selectively cause the machine to turn by speeding up one track and slowing the other while maintaining full power to both tracks. The steering differential 214 includes two drive shafts 216, each connected to a final drive 218 that is configured to move the machine 100. In reference to FIG. 1, each final drive 218 may be connected to a respective drive sprocket 110 and configured to drive one of the two tracks 112.

The operation of the various components and systems of the power train 200 is controlled by electronic controllers. Accordingly, the power train 200 includes an engine controller 220 that communicates with a controller 222 via an interface 224. The electronic controllers 220 and 222 may be a single controller or may include more than two controllers disposed to control various functions and/or features of the machine 100. For example, the controller 222 may be part of a master controller, used to control the overall operation and function of the machine, that is cooperatively implemented with the engine controller 220. In this embodiment, the term "controller" is meant to include one, two, or more controllers that may be associated with the machine 100 and that may cooperate in controlling various functions and operations of the machine 100 (FIG. 1). The functionality of the controller (s), while shown conceptually in the description of FIG. 3 that follows to include various discrete functions for illustrative purposes only, may be implemented in hardware and/or software without regard to the discrete functionality shown. Accordingly, various interfaces of the controller are described relative to components of the power train 200 shown in the block diagram of FIG. 2. Such interfaces are not intended to limit the type and number of components that are connected, nor the number of controllers that are described.

Accordingly, the engine controller 220 is connected to the prime mover 202 via an engine interface 226. The engine interface 226 includes multiple communication channels that are configured to communicate signals and commands between the controller 220 and various components, systems and actuators of the prime mover 202. For example, in embodiments where the prime mover 202 is an internal combustion engine, the engine interface 226 may provide commands that control the speed and load output of the engine. In embodiments where the prime mover 202 is an electric motor (not shown), a command setting the speed of the motor may be sent from the controller 220. Information provided to the controller 220 from the engine may include signals indicative of engine speed (RPM), engine load, temperature of various components, and the like.

The controller 222 is connected to various sensors of the power train 200 that provide information indicative of the operation of the power train 200. Although certain sensor connections are illustrated and described herein to separately extend between the controller 222 and each of the sensors discussed, any appropriate communication scheme may be used, for example, a controller area connection (CAN) bus may be used to collect information from various sensors and provide it to the controller. Based on the information received from the various sensors, the controller 222 is configured to suggest and/or effect gear shifts that can promote the efficient operation of the machine 100. More specifically, the controller 222 is connected to an engine speed sensor 228 via an engine speed communication line 230. Similarly, the controller 222 is connected to a torque converter speed sensor 232 via a torque converter speed communication line 234, and to a transmission speed sensor 236 via a transmission speed communication line 238. Final drive speed sensors 240 are connected to the controller 222 via final drive speed communication lines 242. Each of these and other sensors are configured to provide to the controller 222 signals indicative of the parameter measured by each sensor.

The controller 222 is further configured to effect gear changes such that predetermined gear ratios are employed at the transmission 210. In this way, the controller 222 is arranged to provide commands via a shift command line 244 to a shift actuator 246 of the transmission 210. The shift actuator 246 may include various components and systems configured to selectively cause the engagement of devices, such as clutches and/or gears that are internal or external to the transmission 210. The selective engagement of such devices can provide a desired gear ratio between the input shaft 208 and the output shaft 212 of the transmission 210.

During operation, the engine controller 220 and the controller 222 can cooperate in operating the power train 200 under parameters dictated by an operator of the machine 100, for example, by depressing various pedals, setting a desired machine speed, manipulating the position and operation of various machine implements, steering the machine, and so forth. Sensors and other devices (not shown) are disposed to transduce the operator's commands into signals that are then communicated to the controller 222 in a known fashion. In the illustrated embodiment, an operator interface 248 is connected to the controller 222 via a communication line 250. The operator interface 248 may include a configurable display that provides visual indication of various machine parameters and/or operating modes, and may further include one or more input devices, such as buttons, rollers, a keyboard, and the like that can be manipulated by the operator to provide input commands to the controller 222. For example, the operator can select between a manual shifting mode, a semi-automatic shifting mode or an automatic shifting mode of the machine 100 by appropriately manipulating the controls of the operator interface 248.

Figure 3:
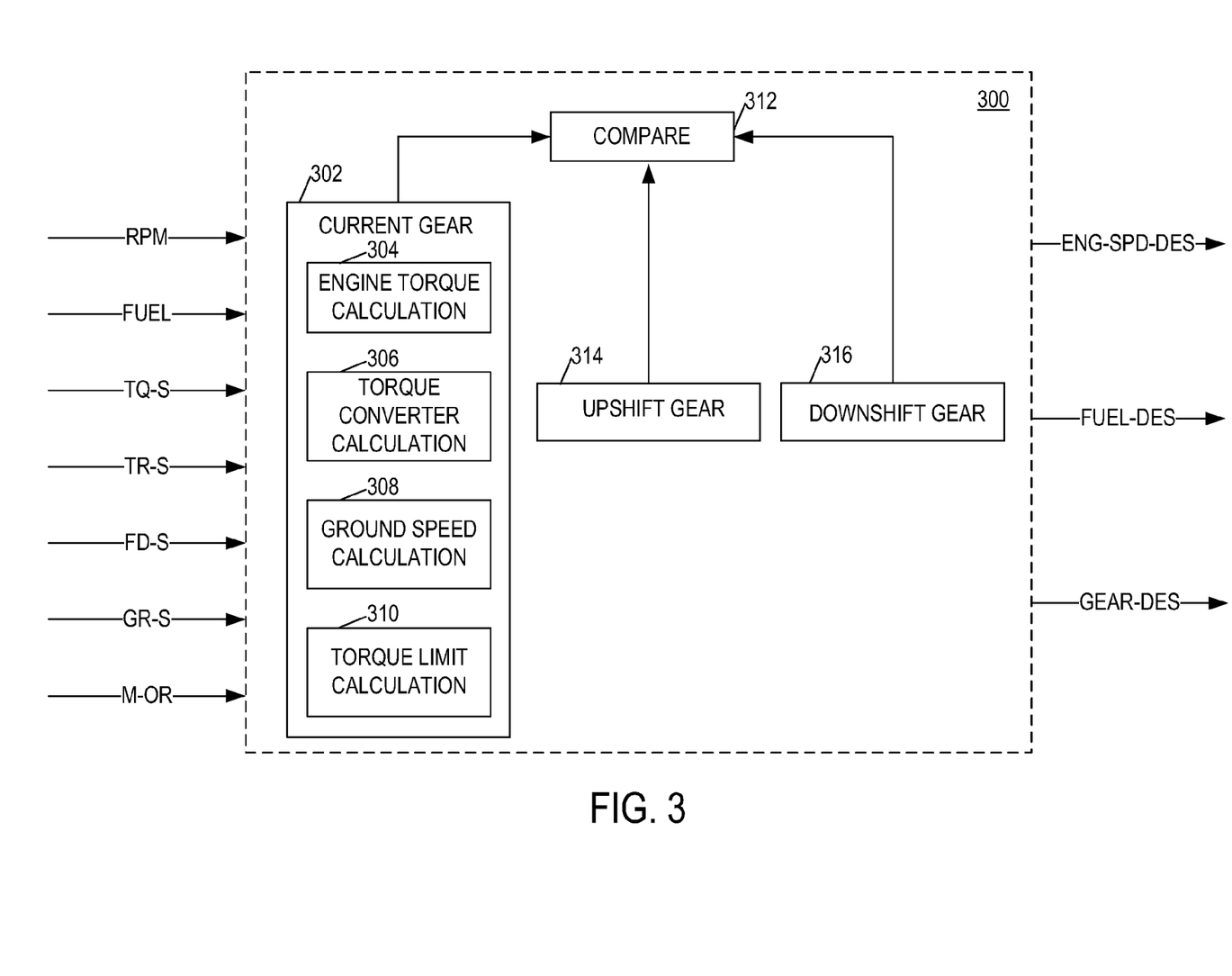
FIG. 3 is a block diagram of a shift control in accordance with the disclosure.

A block diagram for a shift control 300 is shown in FIG. 3. The shift control 300 may be operating within the engine controller 220 and/or the controller 222 in any appropriate form, for example, by way of computer executable instructions, hardware, or any combination thereof. The shift control 300 may further comprise a portion of a larger control scheme, with which it may exchange inputs, outputs and commands, but is shown here separate from any other such controls for purpose of simplicity.

The control 300 is configured to receive inputs of signals indicative of various machine parameters, including engine speed ("RPM"), torque converter speed ("TQ-S"), transmission speed ("TR-S"), final drive speed ("FD-S"), current gear setting ("GR-S"), machine orientation ("M-OR"), which is indicative, for example, of the inclination of the machine in the direction of travel, engine fueling ("FUEL"), and other parameters. Additional parameters that can be provided to the control 300 include signals indicative of the level of fuel remaining in the machine, the level of other fluids such as urea remaining in the machine, oil life, machine operating time, adaptive parameters indicative of the work level of the machine, and the like. The parameters shown as inputs to the control 300 may be provided, for example, from the various sensors shown and discussed relative to FIG. 2, such as the engine speed sensor 228, which provides the RPM parameter, the torque converter speed sensor 232, which provides the TQ-S parameter, the transmission speed sensor 236, which provides the TR-S parameter, and the final drive speed sensors 240, which provide the FD-S parameter(s).

Based on the various inputs received by the control 300, a desired engine speed ("ENG-SPD-DES"), a desired engine fueling ("FUEL-DES"), and a desired gear setting ("GEAR-DES"), are provided. For example, the ENG-SPD-DES and FUEL-DES may be provided to the engine controller 220 such that the prime mover 202 may be operated at a desired speed and load output, and the GEAR-DES may be provided to the shift actuator 246 such that the desired gear ratio may be engaged. At times when the machine is not operating at a gear setting that is deemed desirable by the controller 222, the actuator 246 may up-shift or down-shift the transmission 210 in response to the GEAR-DES signal such that the desired gear setting is engaged.

When determining the desired engine speed and gear setting, i.e., ENG-SPD-DES and GEAR-DES, the control 300 is configured to calculate various power train operating parameters. These power train parameters are calculated or estimated for not only the current gear setting but also for alternative gear settings. The various parameters calculated for the current gear setting are compared to corresponding parameters estimated for alternative gear settings and, if an improvement relative to an efficiency metric may be achieved by selecting an alternative gear, a gear shift can be instructed or otherwise indicated. Efficiency metrics can be related to any aspect of machine operation that can be improved. For example, efficiency metrics can include the rate of fuel consumption by the engine, the rate of fuel consumption in conjunction with a rate of consumption or use of urea or other additives, an estimation of engine or machine emissions, the rate of capture of emissions byproducts, such as soot, the estimated regeneration frequency of a diesel particulate filter, and others. Moreover, an optimal gear setting, which may be the current gear setting or one of the alternative gear settings, may be determined based on the comparison of efficiency metrics. As can be appreciated, a gear shift may be accompanied by a change in engine speed and engine load commands such that the work of the machine may not be affected by the shift.

More specifically, the control 300 includes a current gear calculation module 302, which is configured to conduct various calculations and other operations relative to the current gear setting of the machine during operation. The current gear calculation module 302 may include numerous determinations of efficiency and operational parameters of the machine. Although the calculations of certain parameters are discussed herein, other determinations may also be made depending on the particular configuration of each machine. Accordingly, the current gear calculation module 302 includes an engine torque calculation 304, which is configured to determine, in real time, the torque at the output shaft of the engine, for example, at the shaft 204 as shown in FIG. 2. The determination of engine torque may be accomplished by any appropriate method such as based on an interpolation performed on a tabulated engine map where engine speed (RPM) and engine fueling are associated for various engine operating conditions in a known fashion.

The control 300 further includes a torque converter calculation 306, which is configured to calculate the torque output of the torque converter. One example of a torque converter is shown in FIG. 2 and denoted by reference numeral 206. In the illustrated embodiment, the torque converter calculation determines torque converter parameters including speed ratio, torque ratio, and torque absorption. These determinations are used in a calculation for the converter's output speed and torque based on engine speed and torque. The calculation of the torque output of the torque converter may be accomplished by any appropriate method. In the illustrated embodiment the torque output of the torque converter 206 is determined based on a speed ratio of the torque converter's input (RPM) and output (TQ-S) shafts, respectively, shafts 204 and 208 as shown in FIG. 2. The speed ratio can be input to a table, which can provide a torque modifier that can be applied to adjust an input torque value, for example, the engine torque, to yield the torque at the output of the torque converter.

Other torque outputs monitored as indications of power that is input and/or output from the power train can also be calculated. For example, the final drive (FD-S) and transmission speeds (TR-S) may be used to calculate the torque output from the transmission and the torque or power applied to the ground engaging elements of the machine. Along these lines, the control 300 further includes a ground speed calculation 308 that is configured to determine the ground speed of the machine. The ground speed calculation 308 may be accomplished based on engine speed (RPM), current gear ratio of the transmission as indicated by the current gear setting (GR-S), the final drive shaft speed (FD-S), and other parameters. In one embodiment, the ground speed calculation may consider additional parameters that are indicative of slipping and/or other traction effects.

The current gear calculation module 302 further includes a torque limit calculation 310, which is configured to determine, in real time, any limits that should be applied to the torque produced by the engine or the torque provided to the ground engaging members of the machine. Such torque limits may be adaptively determined, for example, by anticipating a rise or drop in the torque required to maintain a desired speed based on changes in the inclination or orientation of the machine (M-OR). Alternatively, torque limits may be applied to account for changes in the traction conditions of the machine, and other changes in the parameters that affect the ground speed of the machine.

These and/or other parameters calculated for the current gear setting of the machine are provided to a comparison module 312. The comparison module 312 is configured to receive various parameters and compare them with pre-established or predetermined efficiency and other metrics to determine whether the machine is currently operating at a most efficient level. Beside the parameters indicative of operation of the machine at the current gear setting, the comparison module 312 also receives parameters indicative of the expected operation of the machine under alternative gear selections under the same ground speed and power output conditions. Such alternative gear selections may include any other possible gear setting available in the machine. In general, these calculations may be performed, in real time, for each or all possible gear settings that are present in the transmission of the machine. In the illustrated embodiment, the control 300 includes two alternative gear setting calculations. The two alternative gear settings represent adjacent gear settings to the gear setting currently selected, i.e., an up-shift gear setting and a down-shift gear setting.

Accordingly, the control 300 includes an up-shift gear calculation module 314 and a down-shift gear setting module 316. Each of the up-shift and down-shift gear calculation modules 314 and 316 may include estimators similar to those described for the current gear setting module 302. Each module 314 and 316 performs calculations based on the estimated level of each machine operating parameter in the event the corresponding alternative gear setting is selected. For instance, the current gear setting module 302 includes the engine torque calculation 304, which determines the torque output of the engine as previously described. The corresponding calculations in the modules 314 and 316 may be done based on expected engine parameters, for example, engine speed and fueling, that would be required should the alternate gear be selected while still maintaining the same ground speed of the machine and at least the same power output at the ground engaging members. In general, the torque converter input speed and torque required to shift up and down one gear are calculated such that the current transmission output speed and torque are maintained. In a similar fashion, the modules 314 and 316 are configured to calculate the potential level of the torque converter output, and other parameters, and to provide those estimated values to the compare module 312. All these determinations can be limited such that the engine torque output limits, or torque limits derived from machine traction information are not exceeded.

The compare module 312 is further disposed to not only compare the current operating parameters of the machine to predetermined efficiency metrics, but to also compare the expected operating parameters of the machine based on the alternative gear setting to those same efficiency metrics to determine whether it would be beneficial or optimal relative to the efficient operation of the machine to select a different gear without compromising the work currently performed by the machine. As a result of this comparison, the control 300 is able to provide the desired engine speed (ENG-SPD-DES), desired engine fueling (FUEL-DES) and the desired gear setting (GEAR-DES) to appropriate machine modules that can change the engine and transmission operating conditions of the machine to make machine operation more efficient without interfering with the current work capacity of the machine. The desired gear setting GEAR-DES may include a shiftable gear setting on a transmission or any other structural setting that is configured to change the gear ratio of engine torque transmission, such as clutch engagement, clutch locking, overdrive engagement and the like.

In general, one function of the control 300 can be to determine power system performance in the current drive gear and compare it to estimated performance in the next gear up and down, focusing on fuel rate benefits. In one embodiment, the control 300 is used to automatically perform gear shifts and control engine speed to maintain the operator's desired track speed. Alternatively, the control 300 may be configured to recommend a gear shift to an operator, and to perform the shift and engine speed adjustment after authorization from the operator. Optionally, fuel rate based decisions can be bypassed by an appropriate setting, for example, set at the discretion of a fleet owner who will also be able to determine whether an operator can use cruise control in forward and/or in reverse.

When in cruise control mode, i.e., when the control 300 is set to automatically select alternate gears, gear shifting to the optimal gear and control of engine speed can be performed automatically. Regarding engine speed adjustments, the control 300 may further include a setting that can ensure that a minimum engine speed can be maintained to allow for sufficient cooling from an engine fan and to conserve on fuel consumption.

Figure 4:
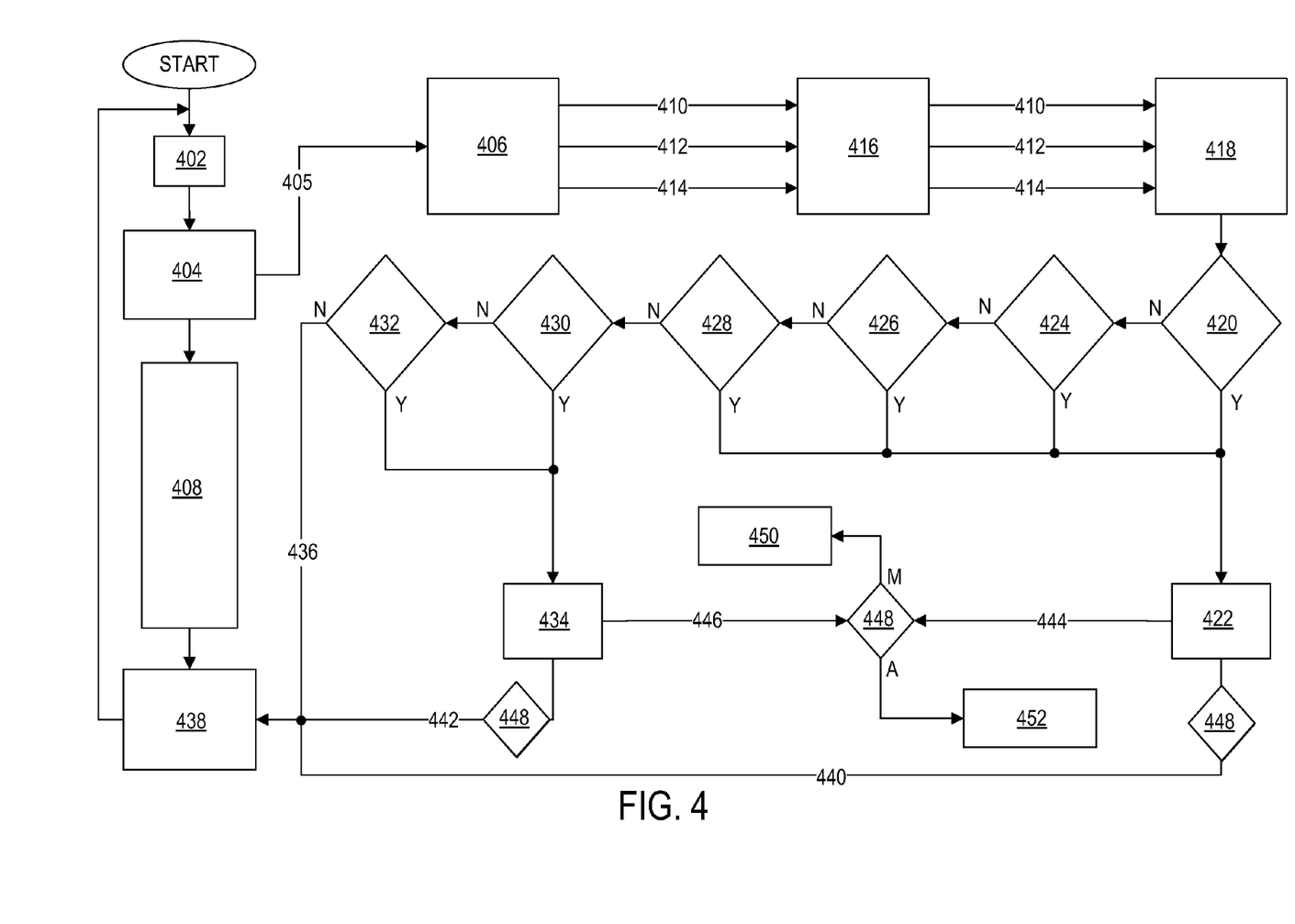
FIG. 4 is a flowchart for a method of operating a machine in accordance with the disclosure.

A flowchart for one implementation of the control 300 is shown in FIG. 4. At an input process 402, various engine, power train and operator parameters are read. As previously described, engine parameters may include engine speed and load-indicative parameters, such as fuel. Power train parameters may include various shaft speeds and torque information from power train components and systems. Operator parameters may include state-related parameters, such as operation in automatic or manual shifting modes, a desired ground speed, and others. These and other input parameters, which may generically be referred to as machine parameters, are provided to a calculation process 404. The calculation process 404 may be configured to perform various functions as described relative to the control 300 shown in FIG. 3 and provide a desired gear setting, a desired engine speed and, optionally, a desired engine torque output, which are collectively denoted as 405 in FIG. 4. These gear setting and engine parameters 405 are provided to an engine process 406, which may be operating as part of an engine electronic control module (engine ECM), and simultaneously be provided to a limit check process 408.

The engine process 406 may determine the engine speed and torque that is required to achieve a desired (or current) ground or track speed. Based on this determination, the engine process 406 may provide up-shift parameters 410, current gear parameters 412, and down-shift parameters 414, each of which represents a power train solution that is suitable for achieving the desired track speed. The gear setting solutions 410, 412 and 414 are provided to an engine fuel control process 416, which is configured to confirm the feasibility of these parameters for engine operation and provide the corresponding engine torque limits and fuel rates for each of the current and proposed gear settings.

The up-shift, current gear and down-shift parameters 410, 412 and 414, having been augmented by engine fueling and torque limit information at the engine fuel control process 416, are provided to an enhanced automatic shifting (EAS) process 418, which is configured to arbitrate between the current and potential operating conditions. One embodiment for at least certain determinations that can be made within the EAS 418 will hereinafter be described.

In the flowchart shown in FIG. 4, in addition to the parameters 410, 412 and 414, the EAS 418 may further examine signals or information indicative of the inclination of machine travel. The inclination of the machine may provide the basis for a predictive method to foresee torque changes when the machine is travelling up or down an incline. When the machine is travelling down a slope, for example, the system may be configured to ensure that the machine will have sufficient retarding capability by avoiding the selection of a higher gear setting while the fore-aft inclination of the machine is determined to be in a downward direction. Thus, an interrogation of whether a down shift is required due to machine pitch angle information is performed at 420. When machine pitch angle information indicates that a down-shift is desired, a down-shift process is initiated at 422, otherwise, a determination whether a down-shift is desired due to engine load is performed at 424. When no load considerations make a down-shift desirable, a determination whether a down-shift is desired due to engine speed or engine fuel rate is performed, respectively, at 426 and 428. Adjustments based on expected torque changes as discussed herein may be performed instead of or in addition to other functions of the machine that can provide braking, dynamic braking or otherwise retarding motion of the machine.

If none of these determinations indicates that down-shift is required, determinations of whether an up-shift is desired due to engine speed or engine load are performed, respectively, at 430 and 432. When the up-shift determination based on engine speed 430 or engine load 432 indicates that an up-shift is desired, an up-shift process is initiated at 434. When no up-shift or down-shift gear changes are desired, a command to maintain current speed 436 is provided to an engine controller 438, and the process repeats beginning at the input process 402. When gear shifts are desired, the engine controller 438 is configured to receive desired engine speed change commands from the down-shift and up-shift processes 422 and 434. More specifically, when the down-shift process 422 is activated, it provides a gear-down desired engine speed 440 to the engine controller 438. In a similar fashion, the up-shift process 434 provides a gear-up desired engine speed 442 to the engine controller 438. These engine speeds have been determined previously in modules 410 and 412. The engine controller 438 is further configured to receive the results of the limit check process 408 to ensure that any engine speed changes that may be communicated to the engine controller 438 are consistent with a desired engine mode of operation.

Depending on whether the shift control system described herein is operating in an automatic or manual mode, activation of the down-shift or up-shift processes 422 or 434 may provide an indication to the operator that a gear shift is desired (manual mode), or may automatically shift the gear (automatic or cruise control mode). More specifically, an indication that a down-shift 444 or an up-shift 446 is required is provided to mode determinator 448. When the system is operating on manual mode, an operator is notified at 450 that a gear shift is desired. Notification of the operator may be accomplished by any appropriate method, such as by illumination of a dash-indicator light, audible signal, tactile indication, or any combination thereof. In the illustrated embodiment, the operator may be notified by an audio signal provided in conjunction with a visual indication on a visual display of the operator interface 248 shown in FIG. 2. When the system is determined to be operating in an automatic mode, a gear selection is automatically conducted at 452 and the desired gear-up and gear-down desired engine speeds 442 and 440 are provided to the engine controller 438.

Industrial Applicability

The present disclosure is applicable to power trains for various types of vehicles including work machines. The systems and methods disclosed herein are advantageously configured to improve machine performance against various efficiency metrics of machine operation, such as the rate of fuel consumption. Machine performance can be improved during operation of the power train by performing determinations that estimate machine efficiency parameters and compare them to the efficiency metrics. These comparisons are carried out not only for operation under a current gear setting, but also under alternative gears such that efficient operation conditions may be achieved by deciding whether to continue operating at the current gear setting or shift to an alternative gear setting depending on which gear setting can provide the most efficient operation. In the illustrated embodiment, a work machine is disclosed, and specifically a track-type tractor, although other machines that may be expected to require steady travel periods in their work, such as motor graders, compactors, pavers and the like may be used.

Specifically regarding the implementation of the shift control to the illustrated track-type tractor, the control operates to determine power system performance in the current drive gear and compare it to estimated performance in the next gear up and down, focusing on fuel rate benefits. Based on these estimations, gear shifts and engine speed can be controlled to maintain a desired or current track speed of the machine.

When the shift control is authorized to automatically shift gears, which can be considered to be in cruise control mode, gear shifting to the optimal gear and control of engine speed can be automatically carried out by the control system. Bi-directional auto-shift and auto-kick down can be disabled when in cruise control mode for a given direction of motion, since the control system is already configured to choose the optimal gear. Bi-directional and auto-kick down functions can resume operating when the system is taken off cruise control mode. When the operator is in cruise control mode reverse only, and the machine is moving in reverse, when the machine shifts to forward motion, the bi-directional shift setting can be a candidate for the forward transmission gear selection.

Regarding engine speed governing, the shift control in the illustrated embodiment is configured to, by default, select the lowest engine speed from all the alternative gear settings that it analyzes. When an operator has a control to qualitatively control machine speed, such as a rabbit/turtle rocker switch and a deceleration pedal, the control's desired engine speed and the engine speed limit can be predetermined by appropriately setting limits in the control system. In this and other ways, the shift control is configured to process various limits and provide a maximum engine speed based on current torque converter and transmission characteristics, in real-time. All inputs for engine speed are evaluated by the engine ECM, and the lowest value is always implemented as the target speed of the engine.

Figure 5:
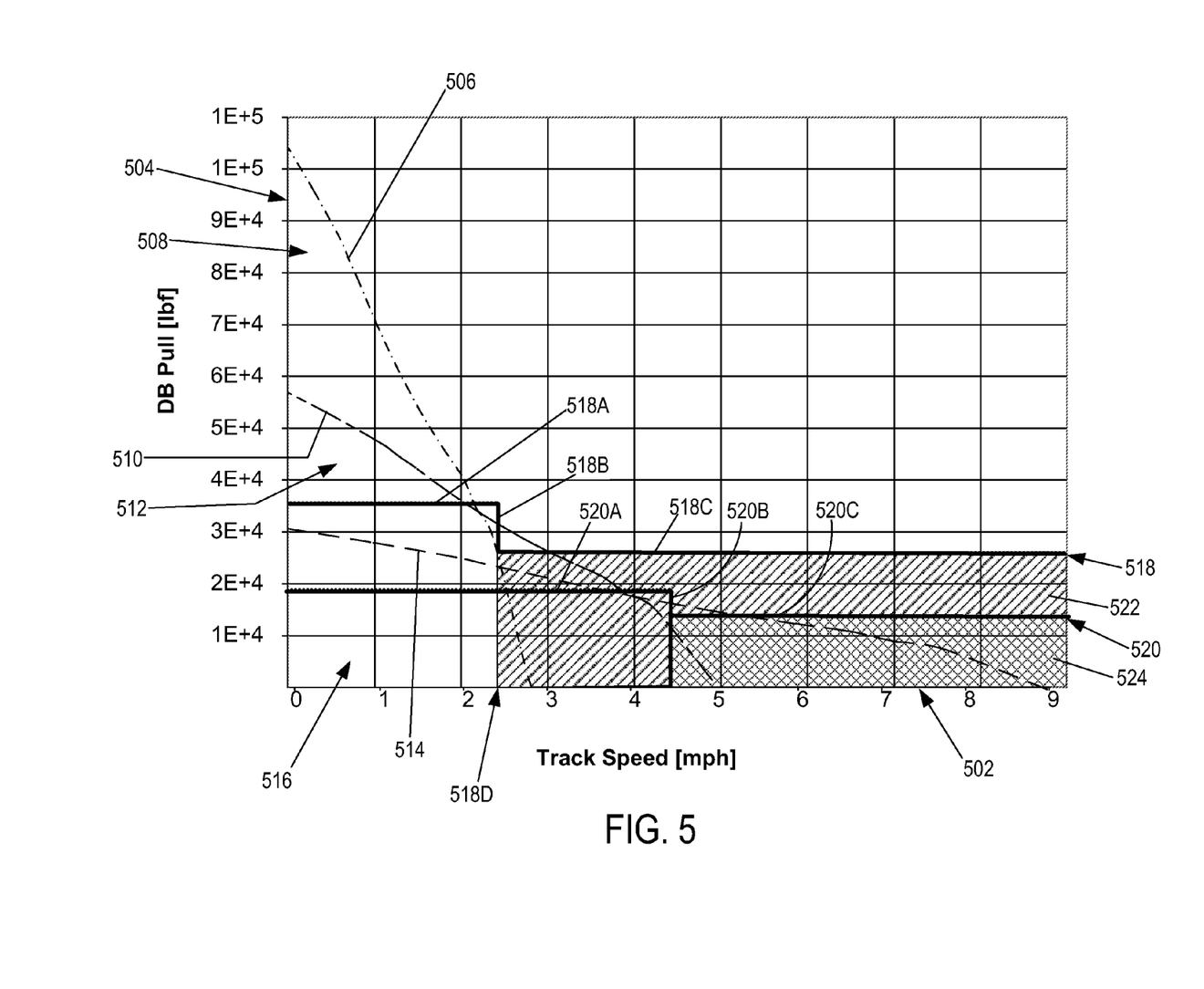
FIG. 5 is a graph illustrating certain aspects of one embodiment of a shift control in accordance with the disclosure.

A graph showing certain aspects of one embodiment of the shift control system and method disclosed herein can be seen in FIG. 5. In the graph, operating points of a machine are shown for each of three gears, where track speed of the machine, in miles per hour, is arranged on the horizontal axis 502, and the drawbar pull force of the machine, expressed in pounds force, is arranged on the vertical axis 504. A first curve 506 corresponds to a collection of maximum operating points when the machine is travelling when in first gear, and bounds a generally triangular area 508 at the lower left corner of the graph. Each of the points in the area 508 represents a permissible operating pair of track speed and drawbar pull force of the machine. Each of these points also corresponds to a particular pair of engine speed and engine fueling operating conditions, with points lying on the first curve 506 representing engine operation along the lug line. Similarly, a second curve 510 bounds a second area 512 that encompasses operating points of the machine with the second gear engaged, and a third curve 514 bounds a third area 516 encompassing machine operating points with the third gear engaged.

As can be appreciated, certain portions of the areas 508, 512 and 516 overlap either between two or all three gears. It is in these areas of machine operation that the advantages of the shift control disclosed herein can be more readily realized in that the combination of track speed and pull force may be attained by any one of two or three different gear settings. In addition to the optimization processes that were previously discussed, additional functions can be implemented to promote the stable and predictable operation of a machine.

Along these lines, the graph illustrates two substantially horizontal stepped lines that extend in parallel to one another, specifically, a shift line 518 and a shift line 520. Each of the shift lines 518 and 520 includes a break or vertical segment, respectively, 518B and 520B as shown in the graph. Each vertical segment 518B or 520B separates its respective shift line 518 or 510 into two horizontally extending segments, 518A and 520C, and 520A and 520C. The vertical segment in the shift line 518B separates the horizontal segment 518A, which encompasses lower track speeds and higher pull forces, and the horizontal segment 518C, which encompasses higher track speeds and lower pull forces. Similarly, the horizontal segment 520A of the shift line 520 encompasses lower track speeds and a higher pull force, while the horizontal segment 520C encompasses higher track speeds and a lower pull force. At points of intersection between the three curves 506, 510 and 514 corresponding to the three gears, it can be seen that the horizontal line segments 518A, 518C, 520A and 520C can represent up-shift and down-shift conditions between gear settings. For example, the segment 518A can be used as an indication that a down-shift from second to first gear should be made as the machine operating point moves past the line during operation in a direction of increasing pull force and possibly decreasing track speed. By the same token, the segment 518C can be used as an indication that an up-shift from first gear back to second gear should be made as the machine operating point moves past the line during operation in a direction of decreasing pull force and possibly increasing track speed. This shifting arrangement can advantageously promote stability by introducing a hysteresis in the up-shift back to the second gear after a down-shift. The hysteresis is analogous to the length of the vertical segment 518B, which generally represents a hysteresis band of pull force. Moreover, the stability of the system is promoted by the positioning of the vertical segment 518B at a particular track speed 518D, which represents a track speed above which shifting into the second gear is allowed. The up-shift and down-shift events relative to the shift line 510 would operate in the same fashion for up-shifts and down-shifts between the second and third gears.

In this way, certain generally rectangular areas may be defined in the chart in which the shift control system can elect certain gears over others unless the operating conditions dictate otherwise. More specifically, a hatched area 522 bound below the line segment 518C indicates a collection of operating points at which the shift control may use the second gear. A cross-hatched area 524 bound below the line segment 520C indicates a collection of operating points at which the shift control may use the third gear.

Figure 6:
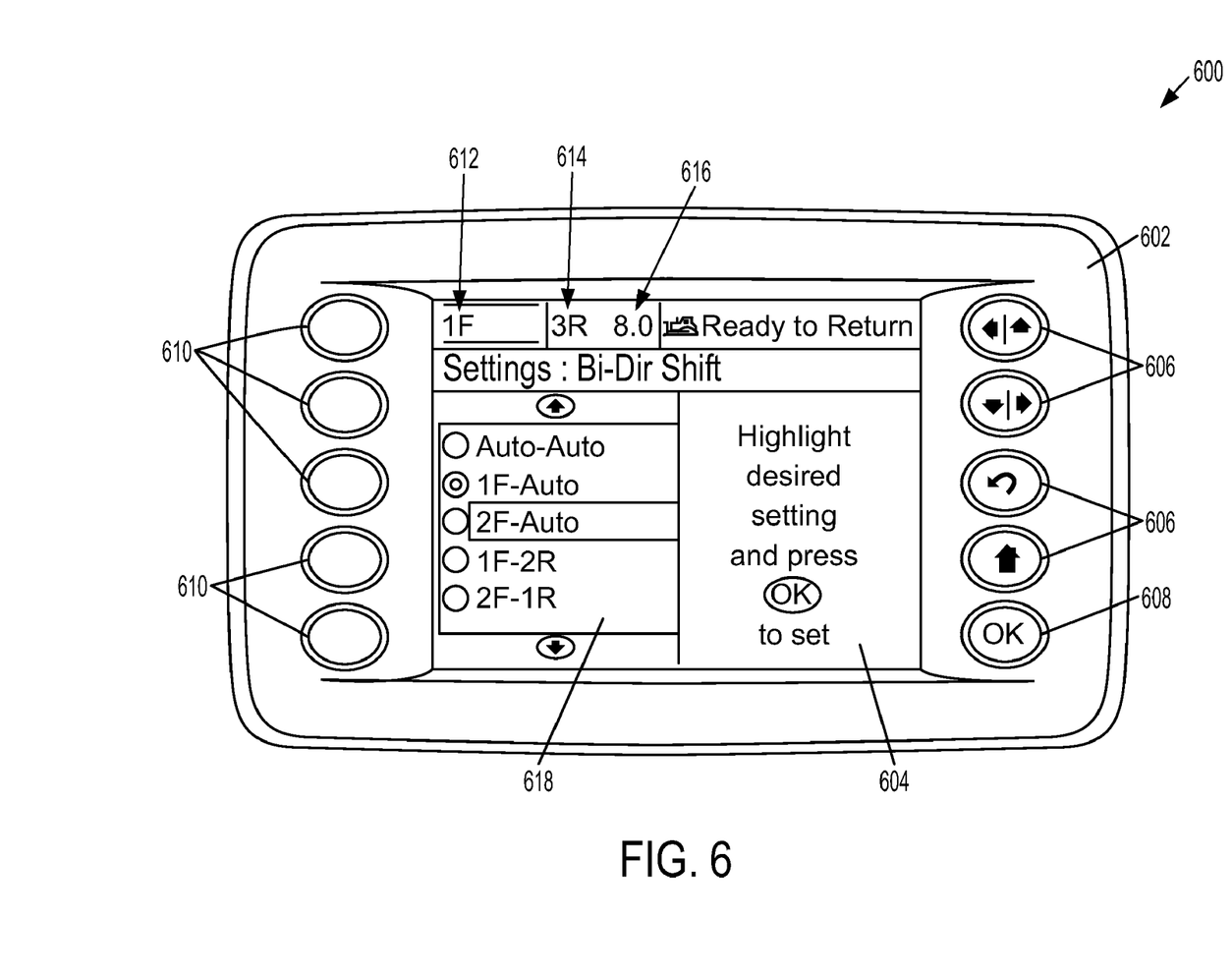
FIG. 6 is an illustration of an operator display for a shift system in accordance with the disclosure.

A sample user interface 600 is shown in FIG. 6. The user interface 600 may be connected to or be part of the operator interface 248 shown in FIG. 2. The user interface 600 includes a housing 602 that encloses various components including a liquid crystal display (LCD) 604. The housing 602 includes a set of navigation buttons 606, a command acceptance button 608, and a set of soft-command buttons 610. During operation, the LCD 604 may be configured to display information about machine operating parameters, such as direction, fuel consumption, loading condition, and others. In addition to displaying information, the user interface 600 may be configured to accept operator instructions and settings that can control operation of various machine systems. Access to the context of an operator operation can be made by menus that can be navigated by selective depression of appropriate navigation buttons 606. Relevant to the present disclosure, the user interface 600 can include a settings menu, which includes a "Bi-Dir Shift" submenu that is configured to set EAS parameters and display relevant information. In the LCD 604, a top left region may display the current forward gear setting of the machine 612, a preselected reverse gear setting 614, and a speed setting 616 for the machine. Various options for manual, automatic, or semi-automatic operating modes of the EAS can be displayed in area 618. The area 618 also includes radio buttons that can show which mode is active. The user may use the navigation buttons 606 to highlight a desired operating mode, for example, "2F-Auto," which denotes a selection of second gear for forward motion and automatic shifting for motion in reverse. Each desired operating mode can be highlighted using the navigation buttons 606 and selected or activated by pressing the command acceptance button 608. Alternatively, the user may press the soft-command button corresponding to the desired mode to effect selection. In general, an operator may access the information shown on the LCD 604 to both determine the current settings of the machine as well as to change the operating mode of the machine.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A machine has a power train that includes a prime mover connected to a transmission having two or more selectable gear settings, the machine further comprising:
   an electronic controller configured to receive and transmit signals indicative of machine parameters, the electronic controller containing computer executable instructions, the computer executable instructions comprising:
     instructions for determining a current value for at least one efficiency metric of the machine that is at least partially based on engine speed during operation at a current gear setting of the transmission;
     instructions for determining a first expected value for the at least one efficiency metric of the machine during operation at a first alternative gear setting of the transmission;
     instructions for comparing the current value for the at least one efficiency metric with the first expected value for the at least one efficiency metric to determine whether a gear shift should be made as between the current gear setting and the first alternative gear setting; and
     instructions for at least one of indicating a gear shift recommendation for an operator and performing the gear shift it is determined that a gear shift should be made.

2. The machine of claim 1, wherein the electronic controller further comprises instructions for determining a second expected value for the at least one efficiency metric of the machine during operation at a second alternative gear setting of the transmission, wherein the instructions for comparing the current value and the first expected value further include comparing the second expected value to determine whether the gear shift should be made as between the current, first and second gear settings.

3. The machine of claim 1, wherein the at least one efficiency metric includes one of fuel consumption of the prime mover, expected noise generated by the prime mover, power output of the prime mover, emissions generated by the prime mover, and expected changes in power consumption of the machine.

4. The machine of claim 1, further comprising instructions for determining additional machine parameters including engine speed when the optimal gear setting is selected such that a machine track speed is maintained substantially unchanged.

5. The machine of claim 1, wherein the first alternative gear setting is an up-shift-gear setting and a second alternative gear setting is a downshift-gear setting relative to the current gear setting of the transmission, and wherein determining the optimal gear setting further comprises:
   selecting the downshift-gear setting when the machine is travelling on an inclined surface, when an engine speed is low, or when an engine load is high; and
   selecting an up-shift-gear setting when an engine speed is high or when an engine load is low.

6. The machine of claim 1, wherein the electronic controller further includes instructions for determining a ground speed of the machine and instructions for maintaining the ground speed of the machine substantially unchanged when the first or second gear settings are selected.

7. The machine of claim 1, further comprising a torque converter disposed between the prime mover and the transmission, and a drive system connected to an output of the transmission, wherein the electronic controller further includes instructions for determining a torque output of the prime mover, a torque input to the transmission, and a drive torque, and wherein the instructions for determining the optimal gear setting at least partially encompass a calculation based on at least one of the torque output of the prime mover, the torque input to the transmission, and the drive torque.

8. A method for operating a machine having an engine connected to a multi-gear power-shift transmission, the engine operating at a current engine speed and providing a current torque, the method comprising:
   determining a current value for an efficiency parameter of the machine that is at least partially based on engine speed while travelling at a current ground speed and expending a current work under a current gear setting;
   estimating a first alternative value for the efficiency parameter of the machine travelling at substantially the current ground speed and expending at least the current work under a first alternative gear setting;
   estimating a second alternative value for the efficiency parameter of the machine travelling at substantially the current ground speed and expending at least the current work under a second alternative gear setting;
   comparing the current value, the first alternative value and the second alternative value to one another;
   selecting as between the current, first and second values an optimum value;
   maintaining the current gear setting when the current value is selected as the optimum value;

providing an indication that a gear shift from the current gear setting to the first or second gear setting is desired when, respectively, the first or second alternative value is selected as the optimum value.

9. The method of claim 8, wherein the efficiency parameter is indicative of fuel economy.

10. The method of claim 8, further comprising providing an indication that a gear shift is desired when an inclination of a travel surface of the machine changes.

11. The method of claim 8, further comprising providing a command configured to cause the transmission to shift from the current gear setting to the first or second gear setting when the indication that a gear shift from the current gear setting to the first or second gear setting is desired is provided.

12. The method of claim 8, further comprising determining an engine speed at the current gear setting and estimating first and second engine speeds for, respectively, the first and second alternative gear settings, selecting a lowest engine speed by comparing the current, first and second engine speeds to one another, and designating the optimum value to correspond to the gear setting having the lowest engine speed.

13. The method of claim 8, wherein the first alternative gear setting is at a higher gear setting than the current gear setting, and wherein the second alternative gear setting is at a lower gear setting than the current gear setting.

14. The method of claim 8, further comprising displaying an indication that a gear shift is desired to an operator via an operator interface device.

15. The method of claim 8, further comprising determining the current engine speed and a current engine load at the current gear setting, estimating a first alternative engine speed and first alternative engine load at the first alternative gear setting, estimating a second alternative engine speed and a second alternative engine load at the second alternative gear setting, and providing the indication that a gear shift from the current gear setting to the first or second gear setting is desired while, respectively, the first and second alternative engine speeds or the first and second alternative engine loads are less than, respectively, a corresponding predetermined threshold engine speed or engine load value.

16. A power train including an engine connected to a multi-gear power-shift transmission, the transmission adapted to operate a drive system at a desired ground speed and power output, the power train further comprising an electronic controller configured to:
   determine a current value for an efficiency parameter while the power train is in a condition adapted for causing the drive system to cause travel of a machine at a current ground speed and expend a current work under a current gear setting of the transmission;
   estimate a first alternative value for the efficiency parameter of the power train under a first alternative gear setting of the transmission;
   estimate a second alternative value for the efficiency parameter of the power train under a second alternative gear setting of the transmission;
   compare the current value, the first alternative value and the second alternative value to one another;
   select as between the current, first and second values an optimum value;
   maintain the current gear setting when the current value is selected as the optimum value; and
   provide an indication that a gear shift from the current gear setting to the first or second gear setting is desired when, respectively, the first or second alternative value is selected as the optimum value while still adapted to maintain the current ground speed and expend at least the current work.

17. The power train of claim 16, wherein the efficiency parameter is indicative of fuel consumption of the engine.

18. The power train of claim 16, wherein the electronic controller is further configured to provide a command configured to cause the transmission to shift from the current gear setting to the first or second gear setting when the indication that a gear shift from the current gear setting to the first or second gear setting is desired is provided.

19. The power train of claim 16, wherein the electronic controller is further configured to determine an engine speed at the current gear setting and estimate first and second engine speeds for, respectively, the first and second alternative gear settings, and designate the optimum value at least partially based on the current, first and second engine speeds.

20. The power train of claim 16, wherein the electronic controller is further configured to determine a current engine speed and a current engine load at the current gear setting of the transmission, estimate a first alternative engine speed and first alternative engine load at the first alternative gear setting, estimate a second alternative engine speed and a second alternative engine load at the second alternative gear setting, and provide the indication that a gear shift from the current gear setting to the first or second gear setting is desired while, respectively, the first and second alternative engine speeds or the first and second alternative engine loads are less than, respectively, a corresponding predetermined threshold engine speed or predetermined threshold engine load value.

* * * * *